United States Patent [19]

Ussery

[11] Patent Number: 4,692,119
[45] Date of Patent: Sep. 8, 1987

[54] EDUCATIONAL PUZZLE BOX

[76] Inventor: Hoyt D. Ussery, 5 Elmwood Pl., St. Charles, Mo. 63301

[21] Appl. No.: 933,317

[22] Filed: Nov. 18, 1986

Related U.S. Application Data

[63] Continuation of Ser. No. 746,967, Jun. 20, 1985, abandoned.

[51] Int. Cl.[4] .......................... G09B 19/24; A63F 9/08
[52] U.S. Cl. .................................. 434/259; 217/12 R; 273/156; 434/260
[58] Field of Search ................ 434/259, 260, 258, 219, 434/234; 273/156; 217/7, 12 R; 446/144, 145; 40/10 A, 10 B, 20 A

[56] References Cited

U.S. PATENT DOCUMENTS

| | | | |
|---|---|---|---|
| 571,790 | 11/1896 | Pitiot | 217/12 R |
| 700,060 | 5/1902 | Loomis | 217/12 R |
| 1,090,139 | 3/1914 | Edmonds | 273/156 |
| 1,176,679 | 3/1916 | Ingraham | 217/12 R |
| 2,835,986 | 5/1958 | Roeder | 434/260 |
| 2,985,451 | 5/1961 | Sims | 434/260 X |
| 3,276,149 | 10/1966 | Barnabas | 434/260 |
| 3,427,731 | 2/1969 | Debolt | 434/260 |
| 3,612,537 | 10/1971 | Sato | 273/156 |
| 4,120,118 | 10/1978 | Mathews et al. | 446/144 |
| 4,183,154 | 1/1980 | Dykes | 434/167 |

OTHER PUBLICATIONS

Child Guidance Toys, "Mechanics Bench", Cleo Learning Aids, Catalog, Feb. 1976, p. 175.

Primary Examiner—William H. Grieb
Attorney, Agent, or Firm—Cohn, Powell & Hind

[57] ABSTRACT

This educational device provides a three-dimensional, box-like structure and includes a plurality of side portions and a plurality of cross members selectively connectible to the side portions. A variety of threaded fasteners and tools are utilized for assembly of the educational device, which provides both an educational function in the use of different tools and threaded fasteners, as well as a toy providing a puzzle challenge by requiring a particular orientation of parts and threaded fasteners for complete assembly.

6 Claims, 6 Drawing Figures

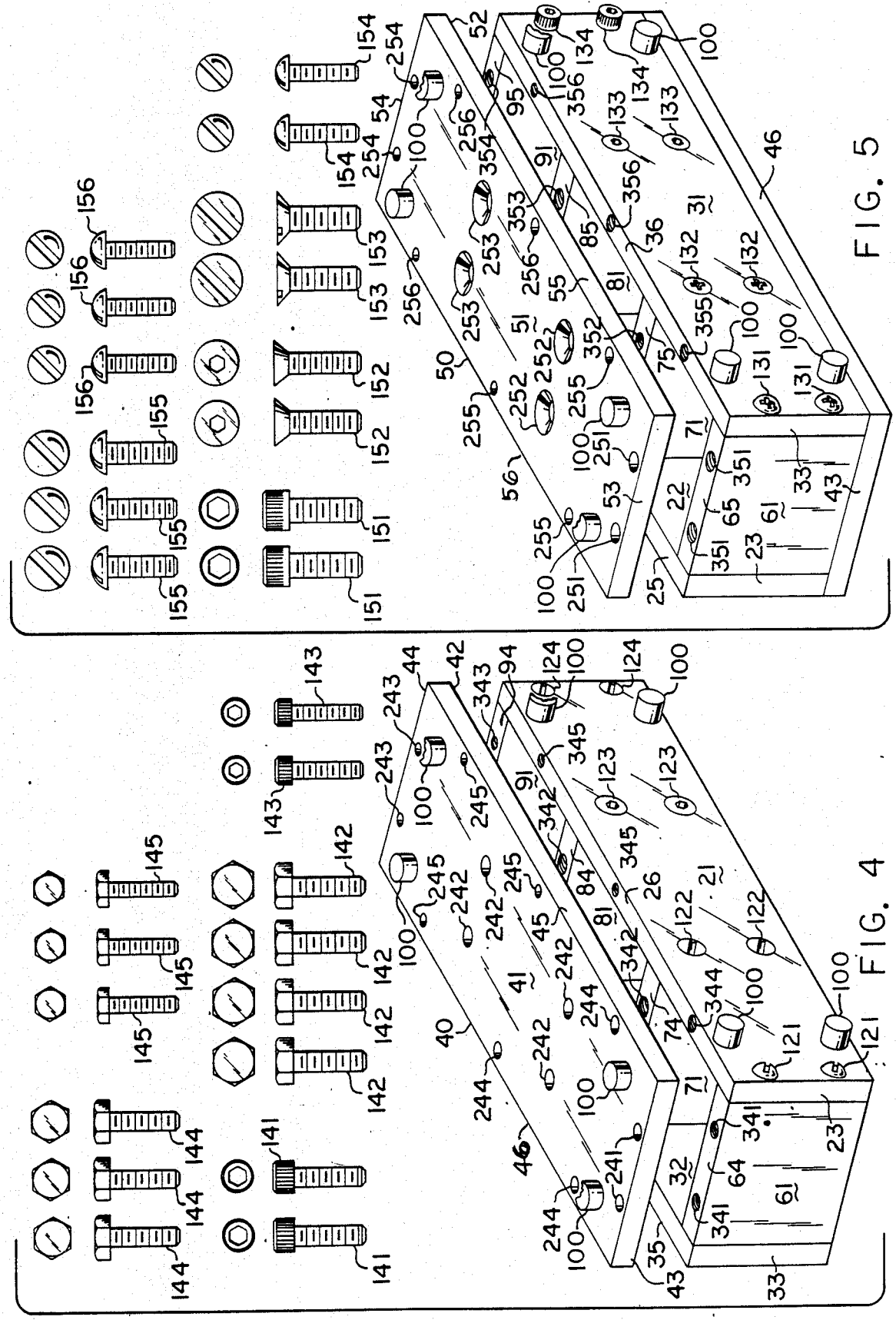

EDUCATIONAL PUZZLE BOX

This application is a continuation of application Ser. No. 746,967, filed June 20, 1985, now abandoned.

BACKGROUND OF THE INVENTION

This invention relates generally to an educational device and particularly to an educational device in which a plurality of different types of fastener elements require the use of different tools for assembly and disassembly of the device.

The prior art discloses several devices which utilize a plurality of different types of fastener elements and tools. For example, U.S. Pat. No. 4,183,154 discloses an instructional chair which is connected by different bolts and uses different joint structures; U.S. Pat. No. 3,276,149 discloses a dexterity testing apparatus requiring the use of various fasteners and tools and U.S. Pat. No. 4,120,118 discloses a toy vehicle having parts which are connected by a variety of different fasteners requiring different tools. Such devices are useful for educational purposes in that they not only teach the use of different types of fastener elements and tools but also the use of the tool with the fastener members. While providing these advantages, the prior art devices do not provide the intellectual exercise that is provided by a device which is like a puzzle, in that it requires the precise location and orientation of parts, which are similar though not identical in overall appearance, for proper assembly. Furthermore, such prior art devices are relatively structured in the particular steps involved in the sequence of assembly or disassembly of the device.

SUMMARY OF THE INVENTION

This educational device provides a three dimensional structure that includes a plurality of structural members as well as a plurality of different fastener elements requiring the utilization of different tools for assembly of the device when the structural members are properly oriented with respect to each other.

This educational device is intended to teach not only physical dexterity, in that it requires the use of the hands for assembly with different fasteners and different tools, but also mental dexterity in that it requires the solution of the puzzle of fitting similar though not identical parts together. Because of its usefulness in teaching mental as well as physical dexterity, the device serves not only to entertain and teach children skills in the use of fasteners and tools which they will retain for life, but it also services a useful purpose in helping to rehabilitate the injured and provide therapy for the handicapped, retarded and the aged by stimulating both mental and physical capabilities.

The educational device includes a plurality of side portions each having a plurality of unthreaded fastener receiving openings having at least two different dimensions; a plurality of cross members each having a plurality of threaded openings associated with the unthreaded openings of the side portions, and a plurality of threaded fastener elements selectively receiveable by associated openings of the side portions and the cross members for connecting said side portions and cross members together when the side portions and cross members are properly oriented, at least two fastener elements having different dimensions compatible with the dimensions of the associated openings.

It is an aspect of this invention to provide that each side portion has a plane of orientation and each cross member has a plane of orientation that is substantially normal to the plane of orientation of each of the side portions.

It is another aspect of this invention to provide that each side portion has an inner face and each cross member has a plurality of edges, said edges including threaded openings, and being disposed in abutting relation with a side portion inner face.

It is still another aspect of this invention to provide that the side portions and cross members cooperate to define a closed box-like structure when assembled which can be compartmentalized.

It is an aspect of this invention to provide that the side portions are substantially rectangular and include inner and outer faces and opposed longitudinal transverse edges, the longitudinal edges of at least two side portions including threaded openings and abutting an adjacent side portion inner face.

It is an aspect of this invention to provide that each side portioning includes a plurality of outwardly extending seating elements having a length greater than the heads of individual fastener elements to avoid marring the support surface.

It is another aspect of this invention to provide that the fastener elements are of a variety of different sizes and types of screws requiring particular alignment of the side portions and the cross members for proper assembly of the device.

It is an aspect of this invention to provide fastener elements which are tool operable and require a variety of tools for fastening in place to complete the assembly.

BRIEF DESCRIPTION OF THE DRAWINGS

FIG. 4 is an exploded perspective view of the device turned on one side, showing further parts of the device in an intermediate assembly state with the parts shown in FIG. 3 assembled, and FIG. 5 is an exploded perspective view of the device turned on the other side, showing in a final assembly stage with the parts shown in FIG. 4 assembled.

DESCRIPTION OF THE PREFERRED EMBODIMENT

Figures 1, 1A:
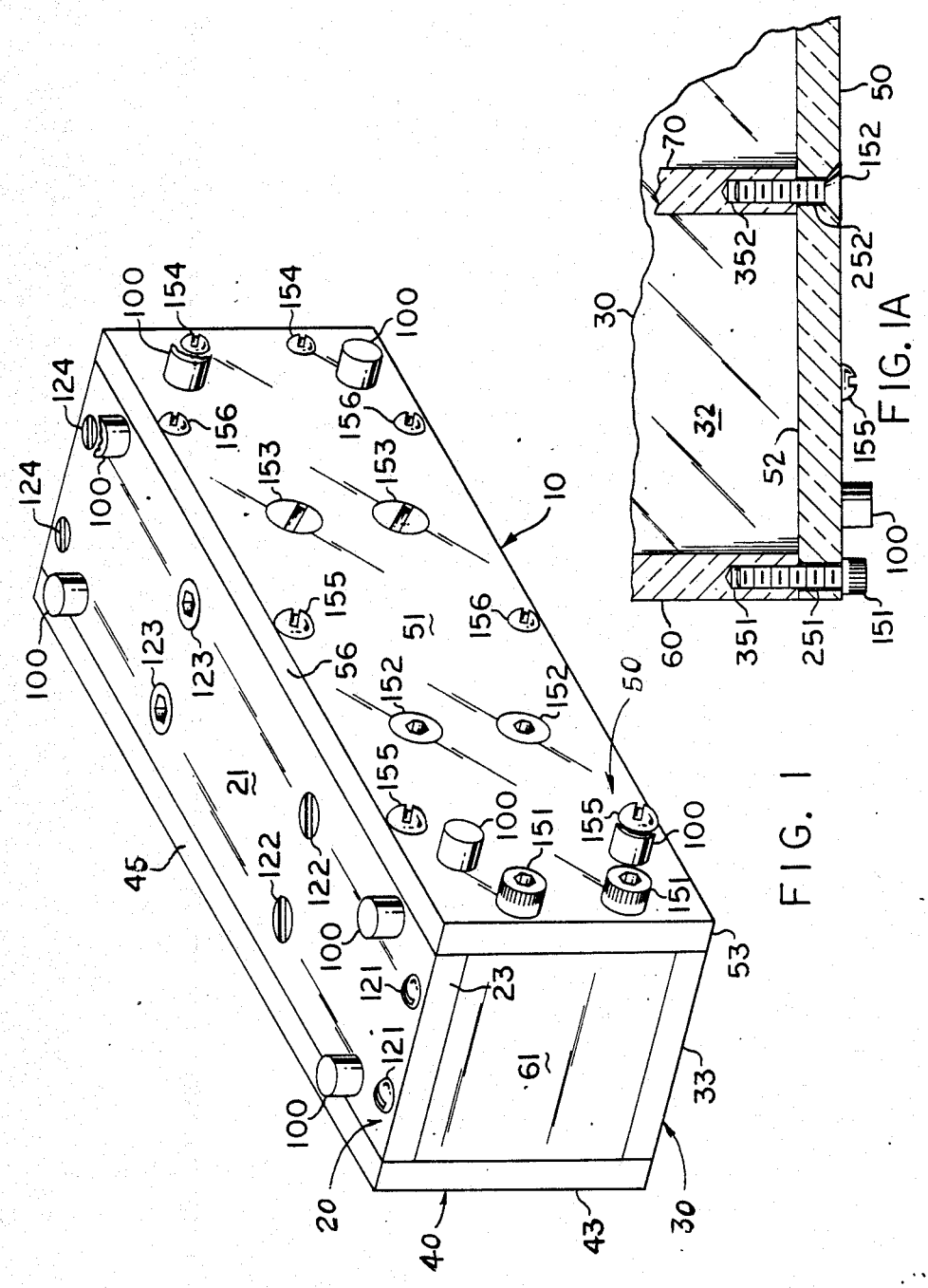
FIG. 1 is a perspective view of the assembled educational device.
FIG. 1A is a fragmentary cross-sectional view showing interior connections of the assembled device.

Referring now by reference numerals to the drawings and first to FIG. 1, it will be understood that the educational device, indicated generally by the numeral 10, comprises a multi-sided three-dimensional structure which, in the preferred embodiment, is in the form of a closed rectangular box-like structure. In this preferred embodiment, the device 10 includes four elongate rectangular side portions 20, 30, 40 and 50. As shown in FIGS. 2-5, the device also includes a plurality of connected members which, in the preferred embodiment, provide four cross members 60, 70, 80 and 90.

Figure 3:
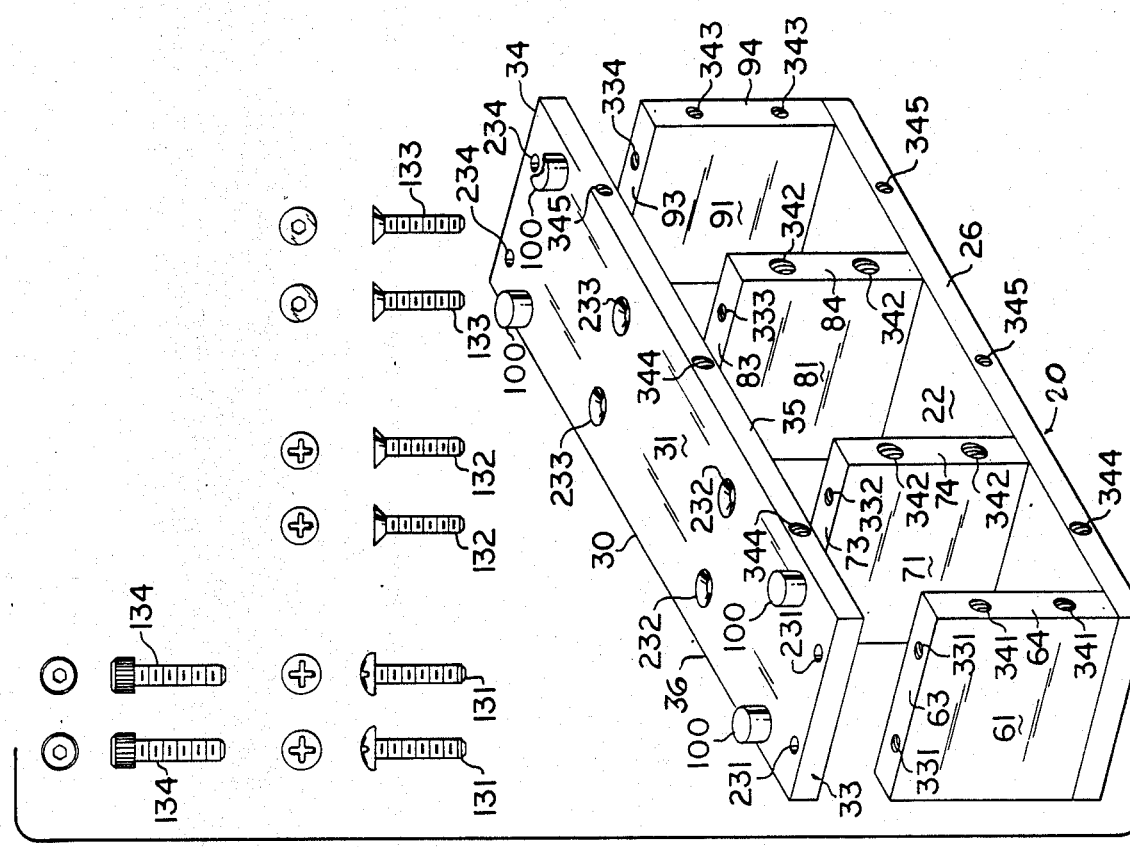
FIG. 3 is an exploded perspective view of the device turned upside down, showing further parts of the device in an intermediate assembly state with the parts shown in FIG. 2 assembled.
Figure 2:
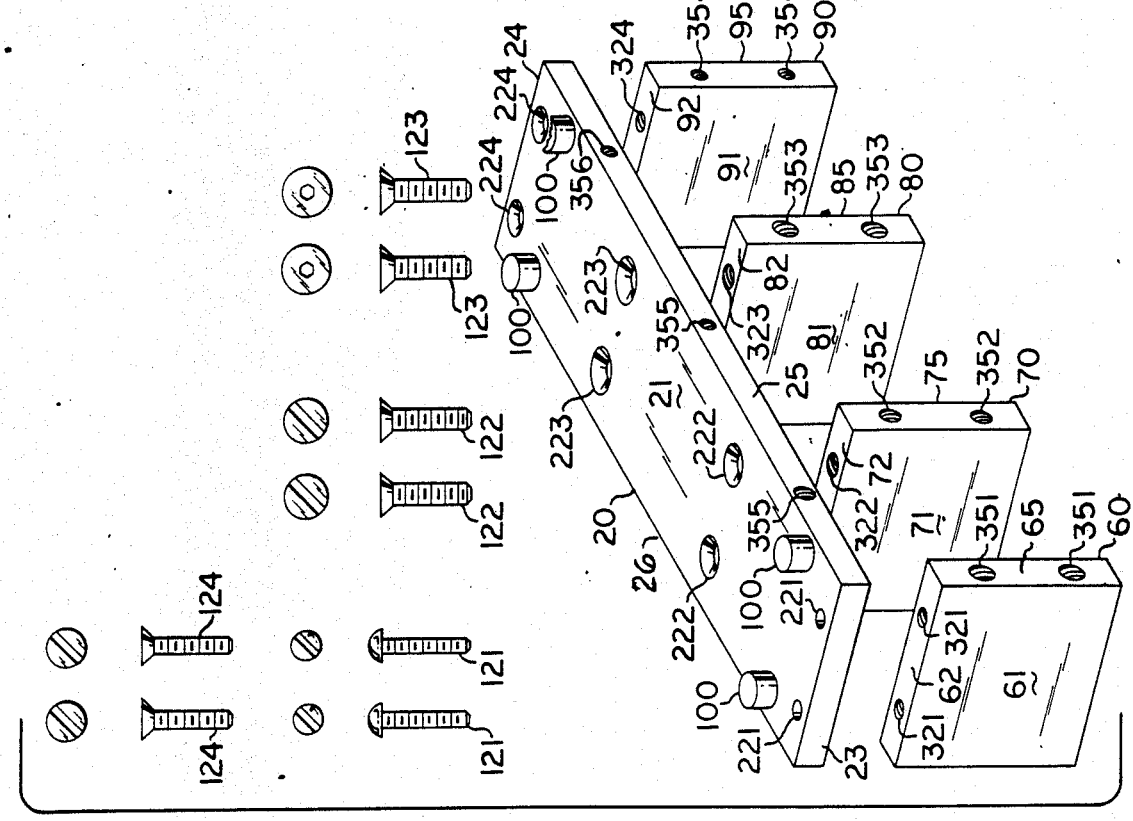
FIG. 2 is an exploded perspective view showing parts of the device of FIG. 1 prior to assembly.

Each of the side portions 20, 30, 40 and 50 include substantially rectangular outer faces 21, 31, 41 and 51 respectively, and opposed inner faces 22, 32, 42 and 52 resectively. Further, each of the side portions 20, 30, 40 and 50 is provided with edge margins between the outer faces 21, 31, 41 and 51 and the inner faces 22, 32, 42 and 52. The side portion 20 as shown in FIGS. 2 and 3 has an end or transverse edges 23 and 24 and longitudinal edges 25 and 26. Likewise, the side portions 30, 40 and 50 have correspondingly numbered edges 33-36; 43-46 and 53-56 respectively.

As shown most clearly in FIG. 2, each of the cross members 60, 70, 80 and 90 include substantially square front faces 61, 71, 81 and 91 and opposed rear faces (not shown). In addition, each of the cross members 60, 70, 80 and 90 is provided with edge margins between the faces which abut the inner faces of the side portions. The cross member 60 has an edge margin, as viewed in FIG. 2, including upper edge 62, lower edge 63, left edge 64 and right edge 65. The cross members 70, 80 and 90 include correspondingly numbered upper, lower, left and right sides 72-75; 82-85 and 92-95 respectively.

Fastener means comprising fastener elements 121-124, 131-134, 141-145 and 151-156 are utilized for assembly of the device 10. As will be more specifically described, each of the side portions and cross members of the device 10 include fastener-receiving openings for receiving the fastener elements in connected relation.

The fastener elements of the preferred embodiment are conventional screws or bolts having a variety of dimensions both in relation to the threaded portions and heads. Thus, an appropriate tool must be utilized with such elements. It will be understood, that the particular fastener elements indicated in the preferred embodiment are only examples of possible fastener elements and that fastener elements having different dimensions and utilizing different tools can be utilized with the device 10 as desired.

Conventional numbering is utilized for identification of the fastener elements. For example, a ⅜-16 screw indicates a nominal ⅜ inch screw having 16 threads per inch. Screw lengths are not indicated, as choice of appropriate lengths can readily be made by those skilled in the art.

It will be understood that the side portions and cross members are constructed of any appropriate material such as wood, plastic or metal and where required are either capable of being formed with threaded openings or capable of retaining an appropriate threaded insert. The assembly of the device will now be described.

Referring now to FIG. 2, which illustrates the assembly of side portion 20 to the cross members by fastener elements 121-124, it will be understood that the fastener elements 121 are 10-32 round head screws, which are receivable by compatible unthreaded openings 221 of side portion 20 and threaded openings 321 of the edge 62 of cross member 60. Also in FIG. 2, a top view of the head of the screw 121 is shown immediately above the elevational view thereof to indicate the particular tool-receiving configuration of the head of the screw 121. The same method of illustration is utilized for the other fastener elements.

The fastener elements 122 are ¼-20 flat head screws which are receivable by the unthreaded openings 222 of side portion 20 and associated threaded openings 322 of edge 72 of cross member 70. As shown in FIG. 2, the openings 222 are countersunk to allow seating of the head of flat head screw 122. Fastener elements 123 are two ¼-20 socket flat head screws which are receivable by the unthreaded openings 223 of side portion 20 and threaded openings 323 of edge 82 of cross member 80 and fastener elements 124 are a pair of 10-32 flat head screws which are receivable by the unthreaded openings 224 of the side portion 20 and threaded openings 324 of the edge 92 of cross member 90. FIGS. 1 and 4 show the device 10 with the fastener elements 121-124 in place.

Referring now to FIG. 3, it will be understood that the assembly of the side portion 30 to the cross members by fastener elements 131-134 is illustrated. Fastener elements 131 are 10-32 round head phillips screws, which are receivable by unthreaded openings 231 of the side portion 30 and threaded openings 331 of the cross member 60. Fastener elements 132 are a pair of 10-32 flat head phillips screws 132 which are receivable by the side portion unthreaded openings 232 and the cross member threaded openings 332. Similarly fastener elements 133 are 10-32 socket flat head screws which are receivable by side portion unthreaded openings 233 and cross member threaded openings 333 and fastener elements 134 are 10-32 socket head cap screws, which are receivable by side portion unthreaded openings 234 and cross member threaded openings 334. Side portion 30 assembled to the cross members is illustrated in FIG. 5.

Referring now to FIG. 4, the assembly of side portion 40 to the cross members and to side portions 20 and 30 by fastener elements 141-145 will now be discussed. As shown, fastener elements 141 are a pair of 5/16-18 socket head cap screws which are receivable by side portion unthreaded openings 241 and cross member side threaded openings 341. Fastener elements 142 are four ⅜-16 hex head screws which are receivable by unthreaded openings 242 of side portion 40 and threaded openings 342, two of which are located in edge 74 of cross member 70 the other two of which are located in edge 84 of cross member 80 and fastener elements 143 are a pair of ¼-20 socket head cap screws which are receivable by side portion unthreaded openings 243 and cross member side threaded openings 343.

As illustrated in FIG. 4, side portion inner face 22 overlies edge 26 of side portion 20 and edge 35 of side portion 30 in abutting relation. Fastener elements 144 are three 5/16-18 hex head screws which are receivable by unthreaded openings 245 of side portion 40 and by threaded opening 344 of edge 26 of side portion 20 and by two threaded openings 344 (not shown) of edge 35 of side portion 30. Fastener elements 145 are three ¼-20 hex head screws which are receivable by unthreaded openings 245 of side portion 40 and by two threaded openings 345 of edge 26 and a threaded opening 345 (not shown) of edge 35 of side portion 30.

Referring finally to FIG. 5, the assembly of side portion 50 to the cross members and to side portions 20 by fastener elements 151-156 is illustrated. Fastener elements 151 are a pair of ⅜-16 socket head cap screws which are receivable by unthreaded openings 251 of side portion 50 and threaded openings 351 of edge 65 of cross member 60. Fastener elements 152 are two 5/16-18 socket flat head screws which are receivable by the side portion unthreaded countersunk openings 252 and by cross member threaded openings 352. Fastener elements 153 are a pair of ⅜-16 flat head screws which are receivable by side portion unthreaded countersunk openings 253 and cross member threaded openings 353 and fastener elements 154 are two ¼-20 round head screws which are receivable by the unthreaded openings 254 of of side portion 50 and threaded openings 354 edge 95 of cross member 90.

Side portion inner face 52 overlies edges 36 and 25 of side portions 30 and 20 respectively. Fastener elements 155 are three 5/16-18 round head screws which are receivable by unthreaded openings 255 of side portion 50 and by a threaded opening 355 of side portion 30 and two threaded openings 355 (not shown) of side portion 20. Fastener elements 156 are ¼-20 round head screws which are receivable by unthreaded openings 256 of side portion 50 and by two threaded openings 356 of side portion 30 and by a threaded opening 356 (not shown) of side portion 20. A view of side portion 50 with fastener elements 151 through 156 is shown in FIG. 1.

In preferred embodiment, as best shown by reference to FIGS. 1 and 1A, the outer face of each side portion, for example outer face 51 of side portion 50, includes a plurality of seating elements in the form of pegs identified by numeral 100. These pegs 100 are integrally attached to said face as by gluing and extend from said face a distance greater than the outstanding head of any fastener element, such as elements 151 and 155, so that such heads are spaced from the support surface. Because of this the device sits evenly on the support surface and the heads are prevented from marring finished table surfaces, and the like.

It will be understood that the completed device, particularly in view of the compartmentalized nature can be used as a storage container.

It is believed that the structural features and functional advantages of the educational device 10 have become fully apparent from the foregoing description of parts. However, for completeness of disclosure a brief description of the use of the device will be given.

It will be appreciated that the various fastener elements disclosed require a variety of tools to be used for assembly and disassembly of the device 10. The particular tools required with the illustrated fastener elements include a phillips screw driver, a straight or blade screw driver, 9/16, ½ and 7/16 box or open end wrenches and 5/16, ¼, 3/16, 5/32 and ⅛ hex key allen wrenches. In the event that other fastener elements are utilized in the assembly of the device 10 the corresponding appropriate tools for the fastener elements would be required.

The educational device 10 is designed not only to teach the use of a variety of fastener elements and corresponding tools but furthermore provides a toy in the nature of a puzzle. This is because the different opening sizes requires that proper orientation of each of the side portions and cross members is necessary to accomplish complete assembly of the device. The device as illustrated, will allow some of the side portions and cross members to receive some fastener elements even when the portions and members are not properly aligned. However, as the device is further assembled a "dead-end" will be reached at which point the remaining fastener elements will not properly fit in the remaining openings.

The drawings FIGS. 2-5 illustrate one particular sequence of assembly of the device 10. It will be understood that there are numerous other possible assembly sequences.

As illustrated in FIG. 2 the side portion 20 is initially connected to the four cross members 60, 70, 80 and 90. Each side portion and cross member has a plane of orientation, relative to the adjacent side portions and cross members, that is required for proper assembly by the fastener elements in that the inner face of each side portion is disposed in abutting relation with an edge of another side portion or cross member. The drawings show the side portions and cross members in their proper planes of orientation and properly located with corresponding openings aligned and in register to receive corresponding fastener elements.

With reference to FIG. 2, it will be understood that if, for example, the cross member 60 were turned around with its front face 61 positioned rearwardly, the fastener elements 121 would still be properly received by the threaded openings 321. However, sides 64 and 65 would then be reversed as viewed in FIGS. 4 and 5. Thus, the threaded openings 341 of side 64, dimensioned to receive 5/16-18 screws, would not properly correspond to the openings 251 of side portion 50 and the ⅜-16 screws 151 which they receive. Hence, complete assembly of the device would be precluded.

Likewise, interchanging of cross members could also prevent complete assembly of the device 10. For example, and with reference to FIG. 2, if the cross members 70 and 80 were interchanged, the threaded openings 322 of cross member 70 and 323 of cross member 80 could still properly receive the screws 122 and 123 since these screws all have ¼-20 threads. However, as will be understood by reference to FIG. 5, the threaded openings 352 of cross member 70 are dimensioned for 5/16-18 screws while the threaded openings 353 are dimensioned for ⅜-16 screws and therefore, assembly of side portions 50 with screws 152 and 153 would not be possible.

These are illustrations of the necessity of proper orientation of similar parts which provide the puzzle aspects of the device. In assembly, ajoining parts are located and properly oriented, then the proper screws are inserted using a tool that is appropriate for the screw being inserted. The device 10 is thereby useful for teaching use of a variety of tools as well as fastener elements.

While FIGS. 2-5 illustrate a particular sequence of attachment of side portions to the cross members, it will be understood, that if desired, two or three of the side portions could be interconnected prior to attachment of any cross members. If desired the four side portions can be assembled without the use of any cross members.

While the device 10, as illustrated, includes four side portions, an enclosed structure can be provided by a device having three or more side portions. A three-sided device would utilize triangular cross members while a five-sided device would utilize pentagonal cross members. In the preferred embodiment, the planes of orientation of the faces of the side portion are substantially normal to the planes of orientation of the faces of the cross members. However, it will be understood that this is not intended to be a limitation and other planar relationships could be used to provide a box having a configuration other than that of the regular rectangular box shown.

While the device 10 can be made of a variety of different materials, a transparent plastic material is particularly advantageous. Transparent plastic allows direct observation of the interaction of the screws and the threaded opening, thereby facilitating understanding of the operation of threaded fasteners.

I claim as my invention:

1. An educational puzzle box comprising:

(a) a plurality of non-coded side portions each having a plurality of unthreaded fastener-receiving openings having at least two different dimensions, (b) a plurality of non-coded cross-members disposed in perpendicular relation to said side portions, each cross member having a plurality of threaded openings associated with the unthreaded openings of the side portions, (c) a plurality of threaded fastener elements selectively receivable by associated openings of the side portions and the cross members for connecting said side portions and cross members together when said side portions and cross members are properly oriented, at least two fastener elements having different dimensions compatible with the dimensions of the associated openings, and (d) the threaded and unthreaded openings being alignable to receive compatible fastener elements but the compatibility of all of said openings and fasteners not being immediately apparent so that the assembly of the box presents a puzzle.

2. An educational puzzle box as defined in claim 1, in which:

(e) each side portion is rectangular and has an inner face including said unthreaded openings and each cross member is a square and has a plurality of relatively narrow edges including said threaded openings and disposed in abutting relation with a side portion inner face, at least one opening in one edge of each cross member being different from at least one opening in another edge of said cross member.

3. An educational puzzle box as defined in claim 2, in which:

(f) the square cross members are identical in size and include opposed end members and at least one intermediate member, said side portions and cross members defining a compartmentalized box when assembled.

4. An educational puzzle box as defined in claim 1, in which:

(e) each of the side portions includes a plurality of outwardly extending surface-engaging seating elements, and (f) at least some of the fastener elements include heads outwardly extending from the side portions an amount less than the seating elements to be clear of the seating surface.

5. An educational puzzle box comprising:

(a) four non-coded side portions, (b) a plurality of non-coded cross members selectively connected to the four side portions for providing a rectangular box, (c) a plurality of individual threaded fastener elements selectively interconnecting the side portions to each other and the side portions to the cross members, the fastener elements being of a variety of types and sizes requiring particular alignment of the side portions and cross members for proper assembly of the device, (d) at least two of the side portions including a plurality of unthreaded openings and at least two of the side portions including a plurality of threaded openings, and (e) the threaded and unthreaded openings being alignable to receive compatible fastener elements but the compatibility of all of said openings and fastener elements not being immediately apparent so that the assembly of the box presents a puzzle.

6. An educational puzzle box as defined in claim 5, in which:

(f) the cross members are square, (g) the side portions are substantially rectangular and include inner and outer faces and opposed longitudinal and transverse edges the longitudinal edges of at least two side portions including threaded openings and abutting an adjacent side portion inner face, and (h) all four side portions include at least four surface engaging seating elements extending outwardly of the side portions an amount sufficient to protect the seating surface from engagement by the threaded elements.

* * * * *